(12) United States Patent
Kölbl et al.

(10) Patent No.: US 6,378,208 B1
(45) Date of Patent: Apr. 30, 2002

(54) PROCESS FOR PRODUCING A MOTOR VEHICLE BODY PART IN A SANDWICH CONSTRUCTION

(75) Inventors: Michael Kölbl, Neuried (DE); Francois De Gaillard, Mouilleron en Pareds (FR)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 09/713,197

(22) Filed: Nov. 16, 2000

(30) Foreign Application Priority Data

Nov. 16, 1999 (DE) .......................... 199 55 167

(51) Int. Cl.⁷ .............................. B21D 53/88
(52) U.S. Cl. .................... 29/897.2; 29/527.3; 29/527.1; 264/46.6; 264/46.7
(58) Field of Search ............... 29/897.2, 527.1, 29/527.3, 527.5, 527.2; 264/45.4, 46.4, 46.6, 46.7

(56) References Cited

U.S. PATENT DOCUMENTS

| | | | | |
|---|---|---|---|---|
| 4,734,230 A | * | 3/1988 | Rhodes, Jr. et al. | |
| 5,271,885 A | * | 12/1993 | Denker et al. | |
| 5,292,465 A | * | 3/1994 | Kobayashi et al. | |
| 5,582,789 A | * | 12/1996 | Stein et al. | |
| 5,837,172 A | * | 11/1998 | Pritchard et al. | |
| 6,045,732 A | * | 4/2000 | Nakatsuji et al. | |

FOREIGN PATENT DOCUMENTS

| | | |
|---|---|---|
| DE | 36 04 175 | 8/1986 |
| DE | 197 09 016 | 9/1998 |

* cited by examiner

Primary Examiner—S. Thomas Hughes
Assistant Examiner—T. Nguyen
(74) Attorney, Agent, or Firm—Nixon Peabody LLP; David S. Safran

(57) ABSTRACT

A process for producing a motor vehicle body part, especially a motor vehicle roof, which is built in a sandwich construction having layers including an outside shell (10) made of a foam material having an outside skin, and an inside shell (11) that is a prefabricated component. Initially, the foam material is placed into a first mold half (16) of a mold tool, the foam material being applied to the shaped outer skin which is placed in the second mold half (17) of the mold tool. Next, the two mold halves (16, 17) are closed and the foam material is allowed to cure at an elevated temperature.

10 Claims, 1 Drawing Sheet

PROCESS FOR PRODUCING A MOTOR VEHICLE BODY PART IN A SANDWICH CONSTRUCTION

BACKGROUND OF THE INVENTION

1. Field of the Invention

The present invention relates to a process for producing a motor vehicle body part. More particularly, the present invention is directed to a motor vehicle roof built in a sandwich construction having layers from an outside shell which consists of a foam layer with an outside skin, and an inside shell. The inside shell is inserted as a prefabricated component into a first mold half of a mold tool, with foam material being applied to the shaped outer skin which is placed in the second mold half of the mold tool, the two mold halves being closed and the foam material being allowed to cure at an elevated temperature.

2. Description of the Related Art

Motor vehicle body parts in a sandwich construction of the type in accordance to the present invention allow for custom vehicle individualization. Applied to a motor vehicle roof in this way the replacement of a conventional motor vehicle roof skin by a modular roof system is made possible. For example, one process allows the motor vehicle manufacturer to produce a modular roof system more quickly and economically in an effort to react to market developments. One such modular roof is disclosed in DE 197 09 016 A1, which discloses a modular roof in a one-piece inseparable execution comprising an inside shell and an outside shell which are produced separately and thereupon integrated. The outside skin of the outside shell of the motor vehicle body part is prepared in a sandwich construction and is conventionally deep drawn from a foil or sheet metal and is foamed with a foam, for example polyurethane, by which the outside shell is completed. Finally, the separately produced inside shell is inserted into one half of the mold of a foaming tool, and the outside shell is positioned into the second half. Thereupon the foaming tool is closed and the body part in a sandwich construction is cured and thereupon removed from the foaming tool as an installable prefabricated component. In this process, however, two separate tools are needed for production, specifically a deep-drawing tool and a foaming tool; thereby resulting in high tool costs and increased production time.

German Patent DE 36 04 175 C2 discloses a process and a means for the mold foaming of foam in conjunction with a hard plastic. This process requires that the hard plastic be placed into contact with one mold half of a mold tool to be pre-molded before mold foaming of the foam by the hard plastic fixed on the mold half. The mold open is pre-molded using a movable plunger which is provided on this mold half, whereupon the foam is foam-molded by application of steam pulse to the hard plastic. This process uses a single tool for producing a foam molding with an outside skin, however, has the disadvantage in that one of the two mold halves is constructed relatively complex with a plunger and a plunger drive and must be actuated in a correspondingly complex manner.

SUMMARY OF THE INVENTION

Accordingly, it is an object of the present invention to reduce the cost in the execution of the initially mentioned process by providing a simple and reliable process for producing a motor vehicle body part in a sandwich construction.

The process in accordance to the present invention is based upon the use of a single mold tool and is carried out such that with two successive tool closing strokes where initially the outside skin of the outside shell is molded and thereupon with a second closing stroke the foam layer of the outside shell is formed and the integration of the outside shell and inside shell is effectuated. In this two-stage production of the motor vehicle body part in the same molding tool, shaping of the outside skin takes place in the first stage with a maximum stroke of the two mold halves, while the foam body is produced and the outside shell and the inside shell are integrated with a reduced stroke in the second stage. This reduced stroke leaves a cavity for the foaming process for producing the desired thickness of the foam layer of the outside shell. By means of the conventional thermal effect, the foam material for the foam layer expands in this cavity and forms a permanent binder between the outside shell and the inside shell as soon as the foam layer has completely cured.

In the preferred embodiment, polyurethane is used as the foam material. The foam material can optionally contain portions of glass fiber to increase the strength of the foam layer. For the outside skin of the outside shell, any flat materials can be used provided they can be formed and exhibit the required strength. For instance, one suitable material for the outside skin is accordingly plastic both in the form of a film and sheet.

In the following, embodiments of the invention are explained by way of example with reference to the drawings.

DETAILED DESCRIPTION OF THE INVENTION

Figure 1:
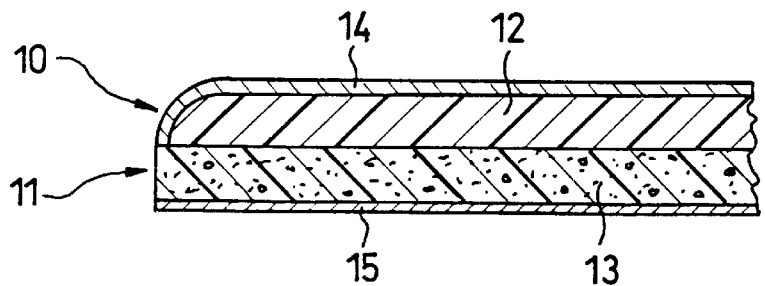
FIG. 1 schematically shows in a section a motor vehicle roof which is designed to be installed as a prefabricated part in a motor vehicle shell, only the edge area of the motor vehicle roof being shown.

As illustrated in FIG. 1, the prefabricated motor vehicle body part which is designed, for example, as a motor vehicle roof is prepared in a sandwich construction formed of shells which are joined to one another in one piece, specifically an outside shell 10 and an inside shell 11. In an exemplary embodiment, both the outside shell 10 and the inside shell 11 have a foam base body or foam layers which are joined to one another. The foam layer of the outside shell 10 is made as a hard foam layer 12, while the foam layer of the inside shell 11 is made as a soft foam layer 13. The outer surfaces of the hard foam layer 12 and the soft foam layer 13 are respectfully covered by a cover layer. The cover layer on the outside of the hard foam layer 12 is made as a relatively hard and solid outside skin 14 consisting of plastic or sheet metal, while the cover layer of the soft foam layer 13 is made as a decorative layer which serves as the inside of the motor vehicle. In the embodiment shown in FIG. 1, the outside shell 10 and the inside shell 11 have a common edge which runs peripherally flush. In practice, however, the edge of the inside shell 11 projects over the edge of the outside shell 10 in order to make available a connecting means with the roof edge of the motor vehicle shell.

FIGS. 2A through 2E sequentially illustrate the production of the modular roof or prefabricated roof as shown in FIG. 1. Accordingly, the production of such a roof part requires a single mold tool having first and second mold halves 16, 17. Initially, a core 18 is inserted into the second mold half 17 of the opened mold tool, the top surface of the core 18 is positioned such that it faces the inner surface of the first mold half 16. The top surface of the core 18 has a shape which corresponds to the inside contour of the outside skin 14 of the finished roof part while the inside surface of the first mold half 16 corresponds to the outside contour of the outside skin 14 of the finished roof part. In the second mold half 17, a flat material 19 is inserted which forms the starting product for the outside skin 14. Alternatively, the flat material 19 can be located on the top surface of the core 18. The flat material 19 may be composed of a plastic, or alternatively a sheet metal.

Figure 2A:
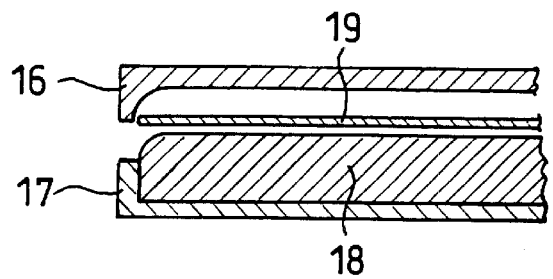
FIGS. 2A–2E sequentially show the steps for producing the motor vehicle body part shown in FIG. 1.
Figure 2B:
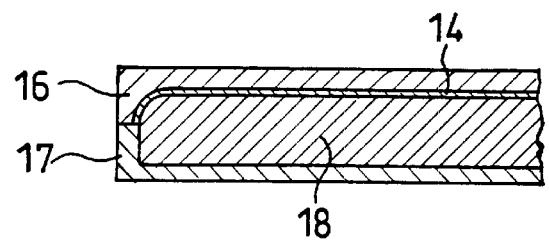

Thereupon, as shown in FIG. 2B, the mold tool is completely closed in a maximum relative closing stroke of the first 16 and second 17 mold halves, by which the flat material 19 is shaped into the completely formed outside skin 14 of the outside shell.

Figure 2C:
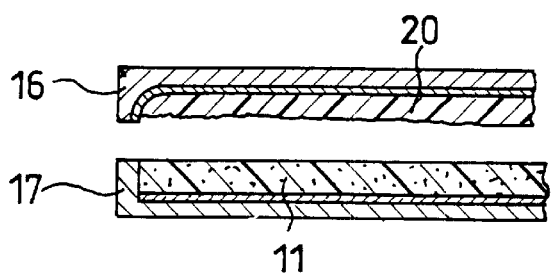
Figure 2D:
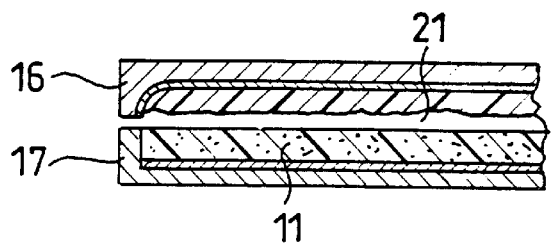
Figure 2E:
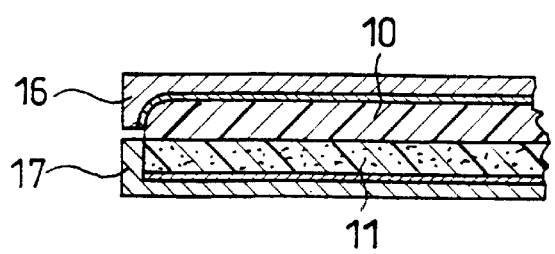

Upon forming the outside skin 14, the mold tool is opened again, as shown in FIG. 2C. In this step the core 18 is removed from the second mold half 17 and the prefabricated inside shell 11 made of the soft foam layer 13 and the decoration layer 15 is inserted into the second mold half 17. The flat material 19, which was formed in the preceding process step into the outside skin 14, is left in the first mold half 16. A foam material 20, for example, polyurethane, is applied to the inside surface of the outside skin 14. Thereupon, as shown in FIG. 2D, the mold tool is closed again, but with a shorter stroke than in the initial closing process so that a cavity 21 remains between the bottom surface of the foam material 20 and the opposing top surface of the inside shell 11. As is shown in FIG. 2E, in the final step of the process heat is supplied to the foam material 20 to join it to the inside shell 11. After a suitable curing time the mold tool is opened again and the finished roof part can be removed.

What is claimed is:

1. A process for producing a motor vehicle body part, the motor vehicle part being built in a sandwich construction having layers including an outside shell having a foam layer with an outside skin, and an inside shell formed as a prefabricated component having a substantially soft foam base layer and a decorative outer layer, the process comprising the steps of:

providing a mold tool having a first mold half and a second mold half;

inserting a core material into said first mold half;

inserting a predetermined size of flat material into said second mold half;

closing said mold tool with a maximum closing stroke of said first mold half and said second mold half, wherein said maximum closing stroke causes said flat material to be molded into said outside skin;

removing said core material from said mold while leaving said outside skin in said second mold half;

inserting said inside shell into said first mold half;

inserting a foam material into said second mold half such that said foam material is applied to a surface of said outside skin;

closing said mold tool with a shorter closing stroke than said maximum closing stroke while leaving a cavity between said foam material and said inside shell to allow expansion of said foam material; and applying heat to said mold tool to expand and join said foam material to said inside shell.

2. The process as claimed in claim 1, wherein said flat material is shaped by said core material during said maximum closing stroke.

3. The process as claimed in claim 1, wherein said foam material comprises polyurethane.

4. The process as claimed in claim 1, wherein said foam material contains glass fibers.

5. The process as claimed in claim 1, wherein said outside skin comprises a plastic film.

6. The process as claimed in claim 1, wherein said outside skin comprises a sheet metal.

7. The process as claimed in claim 2, wherein said foam material comprises polyurethane.

8. The process as claimed in claim 7, wherein said foam material contains glass fibers.

9. The process as claimed in claim 8, wherein said outside skin comprises a plastic film.

10. The process as claimed in claim 8, wherein said outside skin comprises a sheet metal.

* * * * *